US006564200B1

(12) United States Patent
Perkins et al.

(10) Patent No.: US 6,564,200 B1
(45) Date of Patent: May 13, 2003

(54) APPARATUS FOR CROSS REFERENCING ROUTINES AND METHOD THEREFOR

(75) Inventors: Alan Curtis Perkins, Indianapolis, IN (US); Paul Brian Young, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,621

(22) Filed: Jan. 19, 1999

(51) Int. Cl.[7] .................. G06F 17/30; G06F 15/00; G06F 9/45
(52) U.S. Cl. .............. 707/1; 712/200; 717/4; 717/5
(58) Field of Search ............ 707/1–10, 100–104, 707/200–206; 711/100, 123, 154, 200; 712/1, 21, 200, 204–220; 713/1; 717/4, 8

(56) References Cited

U.S. PATENT DOCUMENTS

| | | | |
|---|---|---|---|
| 4,833,594 A | * | 5/1989 | Familetti et al. ........ 713/1 |
| 5,201,048 A | | 4/1993 | Coulter et al. |
| 5,202,985 A | | 4/1993 | Goyal |
| 5,241,671 A | | 8/1993 | Reed et al. |
| 5,511,186 A | | 4/1996 | Carhart et al. |
| 5,515,488 A | | 5/1996 | Hoppe et al. |
| 5,528,735 A | | 6/1996 | Strasnick et al. |
| 5,546,529 A | | 8/1996 | Bowers et al. |
| 5,613,117 A | * | 3/1997 | Davidson et al. ........ 717/144 |
| 5,636,350 A | | 6/1997 | Eick et al. |
| 5,652,899 A | * | 7/1997 | Mays et al. ........ 707/512 |
| 5,671,381 A | | 9/1997 | Strasnick et al. |
| 5,692,176 A | | 11/1997 | Holt et al. |
| 5,715,444 A | | 2/1998 | Danish et al. |
| 5,715,445 A | | 2/1998 | Wolfe |
| 5,768,423 A | | 6/1998 | Aref et al. |
| 5,768,581 A | | 6/1998 | Cochran |
| 5,778,367 A | | 7/1998 | Wesinger, Jr. et al. ........ 707/10 |
| 5,778,368 A | | 7/1998 | Hogan et al. ........ 707/10 |
| 5,787,275 A | | 7/1998 | Li |
| 5,794,178 A | | 8/1998 | Caid et al. ........ 704/9 |
| 5,911,048 A | * | 6/1999 | Graf ........ 709/224 |

FOREIGN PATENT DOCUMENTS

| | | |
|---|---|---|
| EP | 0 694 829 A1 | 1/1996 |
| JP | 9-83888 | 3/1997 |
| JP | 9-91299 | 4/1997 |
| JP | 9-128281 | 5/1997 |
| JP | 9-160931 | 6/1997 |

OTHER PUBLICATIONS

"Tree Traversal Techniques to Implement Enhanced Searches in Tree View", *IBM Technical Disclosure Bulletin*, vol. 38 No. 02, Feb. 1995, pp. 289–291.

"Parci Architecture", *IBM Technical Disclosure Bulletin*, vol. 38 No. 03, Mar. 1995, pp. 13–18.

"Function Cross Reference Utility", *IBM Technical Disclosure Bulletin*, vol. 36, Mar. 1993, pp. 511–512.

* cited by examiner

*Primary Examiner*—Alford Kindred
(74) *Attorney, Agent, or Firm*—Barry S. Newberger; Winstead Sechrest & Minick P.C.; Jeffrey S. LaBaw

(57) ABSTRACT

A apparatus and method for cross-referencing routines in software is implemented. Declarations in the software program are searched for routine declarations. For each routine declaration found, an entry in a first table in a database is generated and a routine identifier for the routine entered. In response to each identifier entered, the routines corresponding thereto are searched for calls to other routines. For each call, entry in a second table is generated in which, in a first field, the identifier of the routine being searched is written, and in a second field, an identifier for the called routine is written. The user may select for outputting the routines called by a particular routine, in which case, the entries are accessed via the first field and the contents of the second field are output. Alternatively, the user may select for outputting the routines called by a particular routine, in which case the entries are accessed via the second field and the contents of the first field are output.

24 Claims, 5 Drawing Sheets

Figures 3A, 3B:
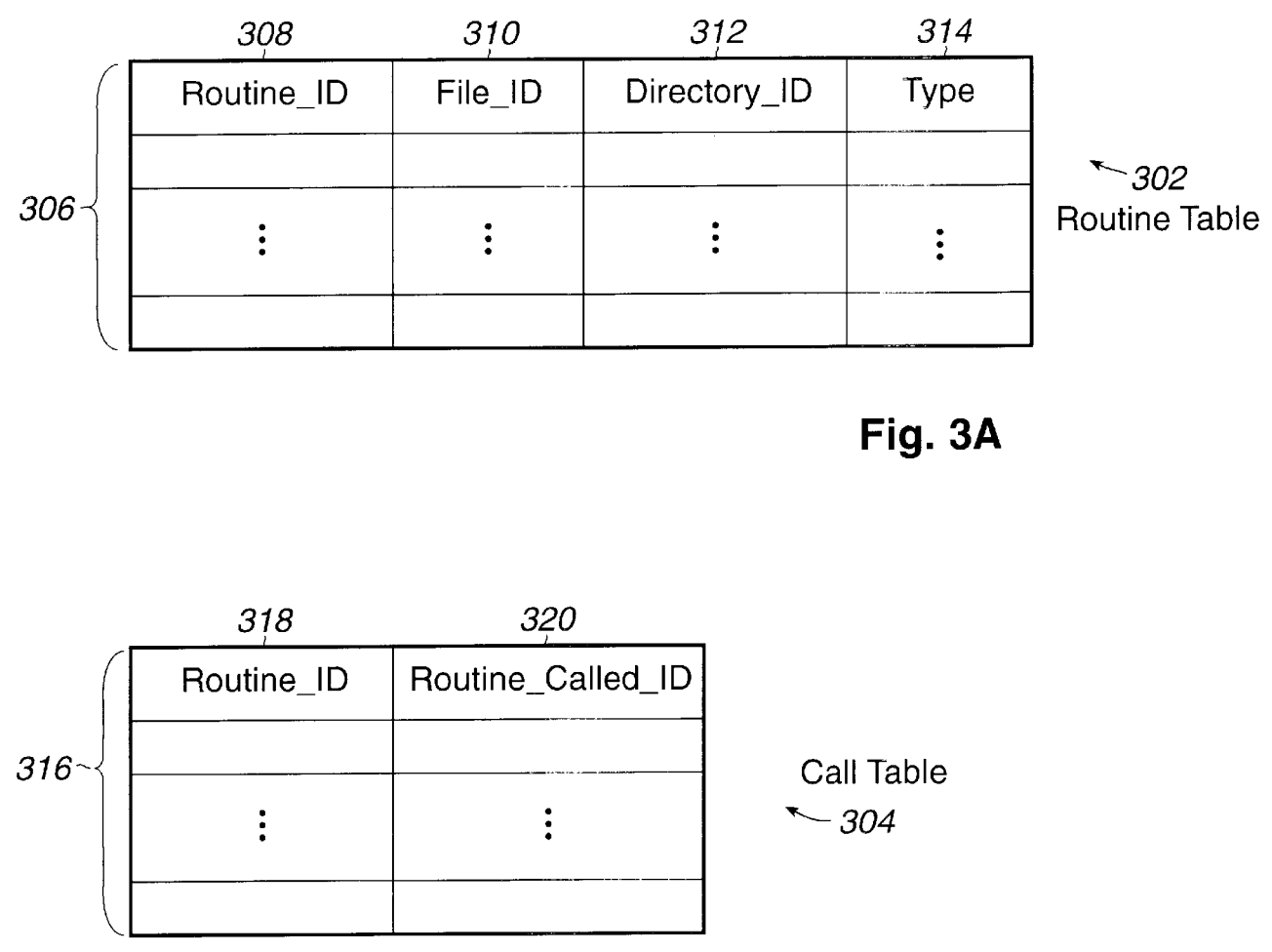

Routine Table — 302

| Routine_ID | File_ID | Directory_ID | Type |
|---|---|---|---|
| ... | ... | ... | ... |

Call Table — 304

| Routine_ID | Routine_Called_ID |
|---|---|
| ... | ... |

316 / 318 / 320

Fig. 3B

APPARATUS FOR CROSS REFERENCING ROUTINES AND METHOD THEREFOR

CROSS-REFERENCE TO RELATED APPLICATION

The present invention is related to U.S. patent application Ser. No. 09/232,622 entitled "Tree-Based Interface Apparatus for Display of Call Dependencies and Method Therefor," filed Jan. 19, 1999, which is hereby incorporated by reference.

TECHNICAL FIELD

The present invention relates in general to data processing systems, and in particular, to a mechanism for tracking routine dependencies in data processing system software.

BACKGROUND INFORMATION

It is commonplace in the data processing art for software to be written in a modular structure. The tasks which the software performs are typically embodied in a set of subtasks which, depending on the development environment, may be referred to as procedures, functions, methods, subroutines or events. An event is a particular software routine that receives user interactions via standard user interface devices. Although, again depending on the development system, these may have different connotations, for the purposes of the present invention they will be collectively referred to as routines.

A complex software program which may be typical of the complex tasks performed by modem data processing systems may include a multitude of such procedures. Moreover, routines typically refer to other routines, whereby a hierarchical structure results. In a sophisticated software product, a complex hierarchical, or nested, chain of routine references may result. Tracking this hierarchical chain of dependencies as a development of a software program progresses, may be difficult. Additionally, maintenance of the product, which may be performed by persons other than the developers, may also be complicated by the complex hierarchical structure. Thus, there is a need in the art for a mechanism to track and display the cross referencing of procedures in data processing software, thereby allowing the programmer to have knowledge of the calling and called routines that will be affected if changes are applied to any given routine.

SUMMARY OF THE INVENTION

The aforementioned needs are addressed by the present invention. Accordingly, there is provided, in a first form, a method of cross-referencing routines. The method includes the step of searching a program file for routine declarations, and entering a routine identifier in a first table in response to a corresponding routine declaration. Each routine corresponding to the routine identifier is searched for routine calls in response to the routine identifier.

There is also provided, in a second form, data processing system circuitry operable for searching a program file for routine declarations. The data processing system also includes circuitry operable for entering a routine identifier in a first table in response to a corresponding routine declaration, and circuitry operable for searching for routine calls in each routine in response to each routine identifier.

Additionally, there is provided, in a third form, a computer program product operable for storage on program storage media, the program product operable for cross-referencing software routines. The program product includes programming for searching a program file for routine declarations. Also included is programming for entering a routine identifier in a first table in response to a corresponding routine declaration, and programming for searching for routine calls in each routine in response to each routine identifier.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A schematically illustrates a routine table record in accordance with an embodiment of the present invention;

FIG. 3B illustrates a call table record in accordance with an embodiment of the present invention.

DETAILED DESCRIPTION

Figure 1:
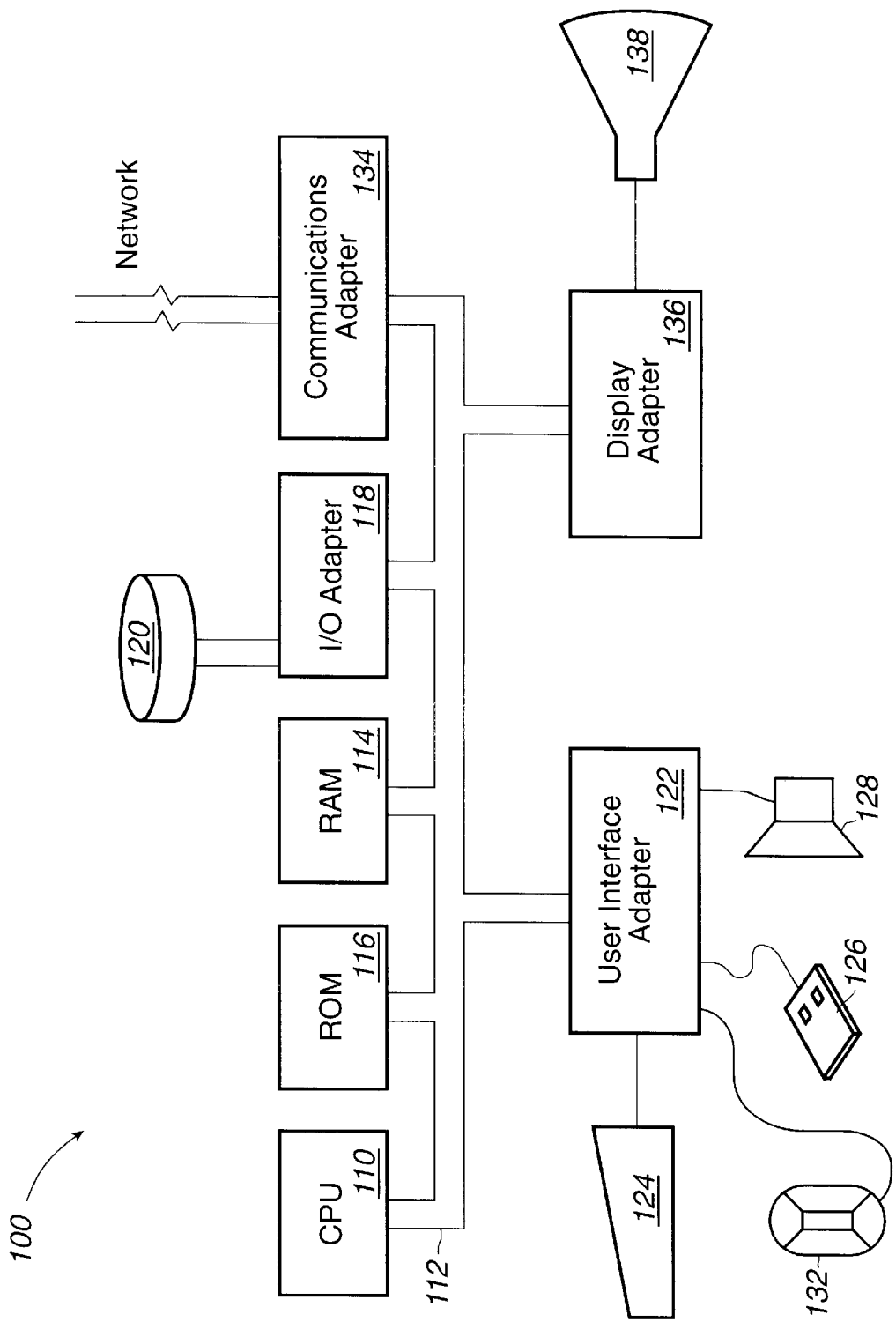
FIG. 1 illustrates, in block diagram form, a data processing system in accordance with an embodiment of the present invention.

The present invention provides a mechanism for identifying the call dependencies of the routines contained in data processing software. A database is created for holding a plurality of data structures corresponding to each routine defined in the software. A first data structure set includes a data structure for each routine and contains the routine identifier type and directory and file identifiers. A second data structure type includes the routine identifier and the identifier of called routines. The third data structure type contains the software program identifier and identifiers for software programs used by that software program. The software program being analyzed is parsed, and procedures identified. For each identified procedure, a set of data structures of the types just described are created and inserted in the database.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2A:
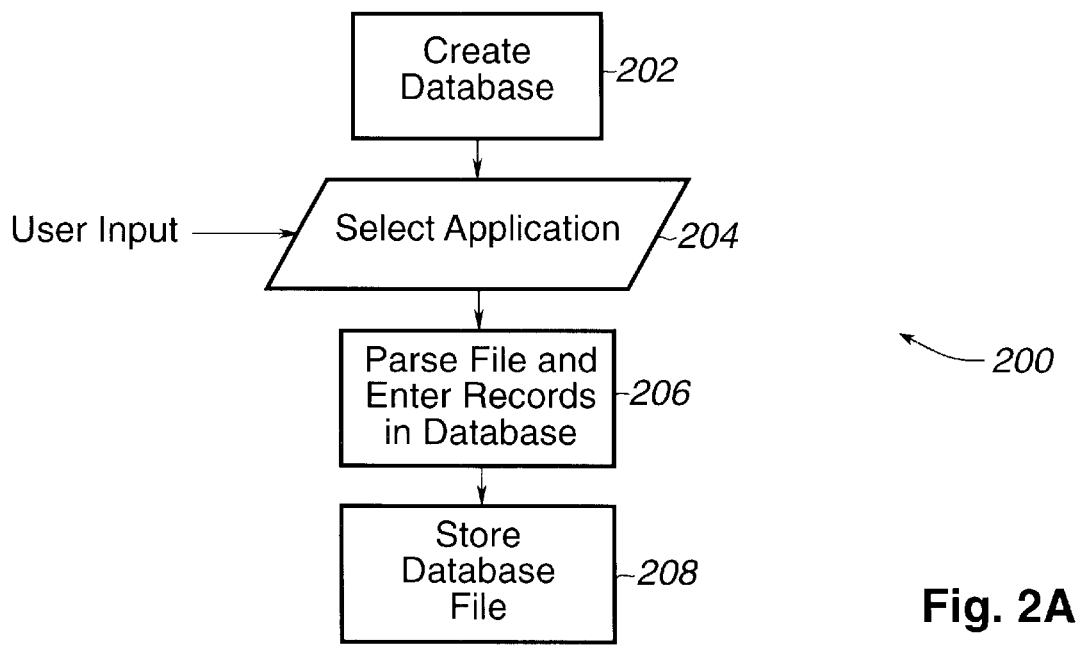
FIG. 2A illustrates, in flow chart form, a methodology for analysis of all dependencies in accordance with an embodiment of the present invention.

Refer now to FIG. 2A illustrating, in flow chart form, a methodology for analysis of call dependencies in accordance with the present invention. In step 202, a database, for holding data structures to be described in conjunction with FIG. 3 is created. In step 204, in response to user input, the application for analysis is selected. In step 206, the application selected in step 204 is parsed, and records for each routine found are created and entered into the database created in step 202. An application may be included in one or more program files which can contain one or more routines.

Figure 2B:
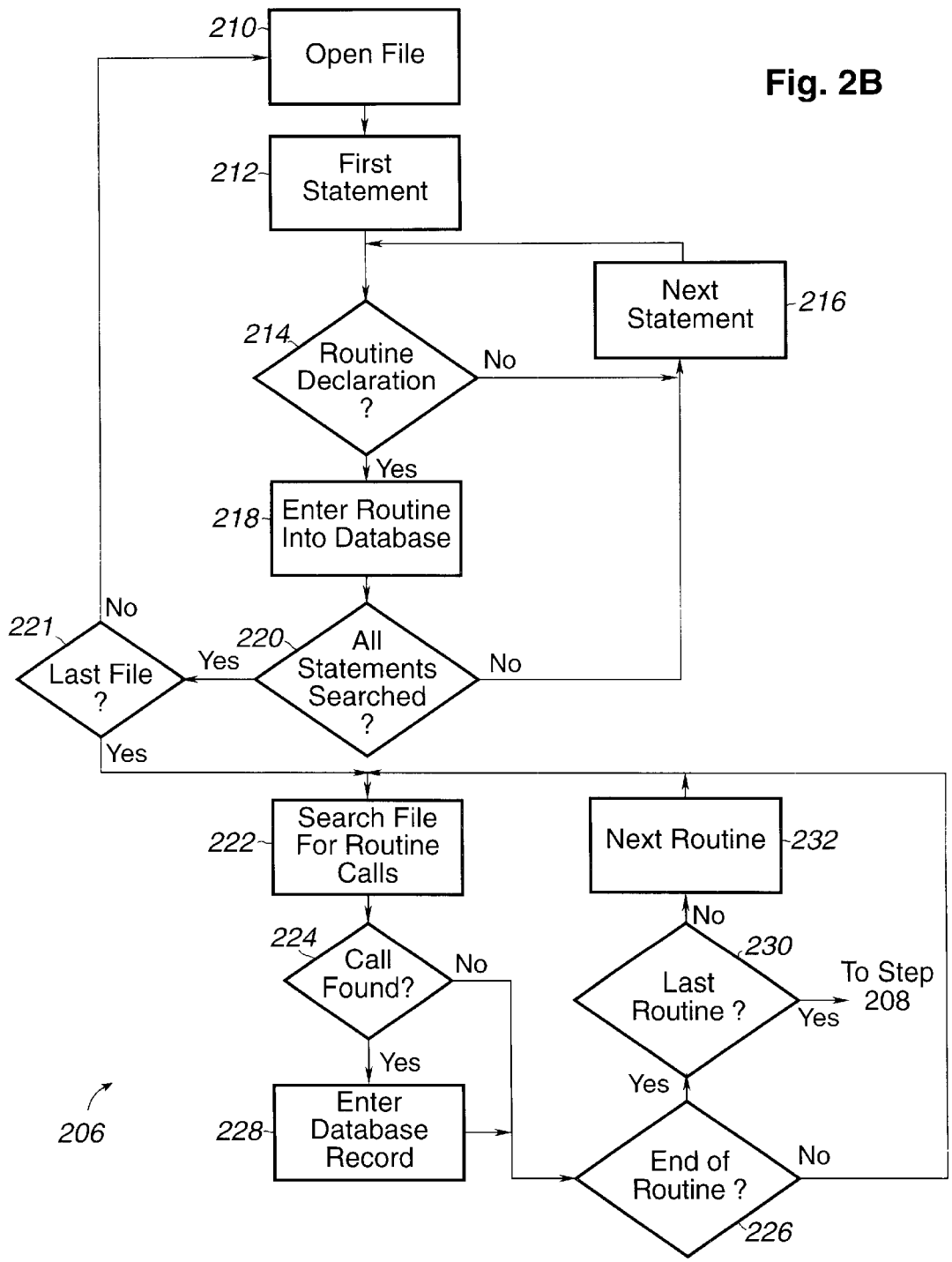
FIG. 2B illustrates, in flow chart form, a methodology for creating dependency records in accordance with an embodiment of the present invention.

Step 206 may be further understood by referring now to FIG. 2B in which a flow chart for the methodology of searching software files and creating database records is illustrated in further detail. In step 210, each file corresponding to the application selected in step 204 is opened.

Methodology 206 then analyzes each file in order to find routine declarations. In step 212, a first program statement is analyzed. If that statement is not a routine declaration, in step 214 a next statement is analyzed, step 216, and methodology 206 returns to step 214. If, however, in step 214 the statement is a routine declaration, in step 218 an entry in a routine table, or data structure, in the database created in step 202, is created for the routine.

A routine table 302 is schematically illustrated in FIG. 3A. Routine table 302 includes a plurality of entries 306. An entry will be created for each routine found as methodology 206 proceeds. Each entry includes a routine identifier (ID) field 308, a file ID field 310, a directory ID field 312 and a type field 314. The routine name is entered in routine ID field 308, and the name of the file containing the program being analyzed is entered in field 310. The directory name of the directory in which the file entered in field 310 is found is entered in field 312. It would be understood by one of ordinary skill in the art that a software program may be embodied in multiple files which themselves may be organized in multiple directories. This may be done, for example, to facilitate concurrent development of different portions of the software by several programmers. Thus, a routine may call other routines which may be stored in different files and, possibly, different directories from those containing the calling routine. The identifiers in the file ID field 310 and directory ID field 312 allow methodology 200 to locate the routine definitions when analyzing the call dependencies, discussed in conjunction with steps 222–230 below.

Additionally, a routine type field 314 is provided. Field 314 may contain a routine type descriptor, such as "event" type or "function" type. The user may limit a search by preselecting a routine type of interest, whereby only routines having the corresponding type are analyzed for call dependencies.

Returning to FIG. 2B, methodology 206 determines, in step 220 if all statements have been analyzed. If each statement in the software program has not been analyzed, a next statement is analyzed in step 216. Methodology 206 then loops through steps 214, 216, 218 and 220 until all statements have been analyzed. As methodology 206 loops through these steps, for each routine statement found, an entry is generated in routine table 302. In step 221, it is determined if all files have been analyzed. If not, methodology 200 returns to step 210 to begin the analysis of a next file, and loops through steps 210–221 until all files have been analyzed.

Methodology 206 then continues, in step 222, by analyzing each file by parsing each token of each statement of the program code, statement by statement, to determine which routines can call which other routines. As the parsing occurs, the methodology maintains which routine is being analyzed. If in step 224, the current statement is not a call to a routine, the "No" branch is followed, and, in step 226, it is determined if an end of the file has been reached. If, however, in step 224 a call is found, in step 228, an entry is created in a call table, or data structure, in the database created in step 202.

FIG. 3B illustrates a call table 304 in accordance with the present invention. Call table 304 includes a plurality of entries 316. Each entry includes a routine ID field 318 and a routine-called field 320. The name of the routine being searched, that is, the calling routine is entered in 318, and the name of the called routine is entered in field 320. A calling routine may call one or more routines within the definition of the calling routine. In such a case, multiple entries in call table 304 may have the same name, or identifier, in procedure ID field 318.

Returning to FIG. 2B, methodology 206 then determines in step 226 if the end of the current file has been reached. If not, methodology 206 then returns to step 222 to continue to searching the current file for additional routine calls. If, however, in step 226 the end of the file has been reached, in step 230 it is determined if the current file is the last file. If so, then all files have been searched for call dependencies and methodology 206 then returns to step 208, in FIG. 2A. Otherwise, methodology 206 continues with the next file and searches for call dependencies therein by looping through steps 222, 224, 226, and 228.

After all routines have been searched for their call dependencies, as previously described, methodology 206 then proceeds to step 208 in FIG. 2A. In step 208, a database file containing the database created in step 202 containing the routine table 302 and call table 304 described herein above is output.

Figure 4:
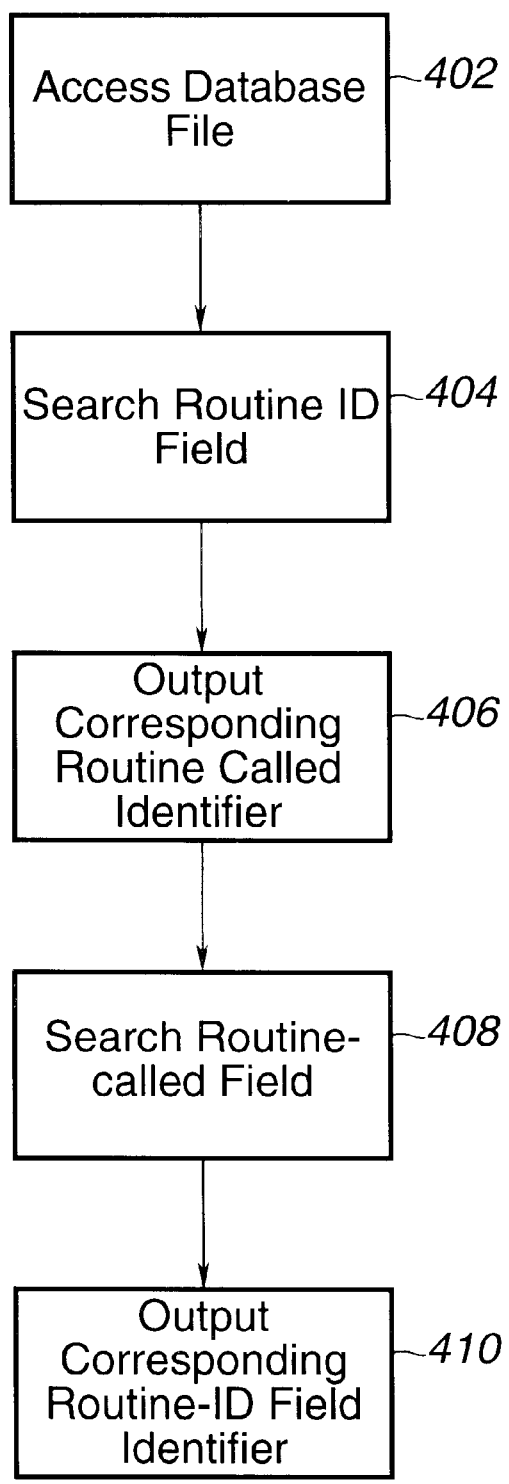
FIG. 4 illustrates, in flowchart form a method of using a database of dependency records in accordance with the present invention.

By accessing the database file, both the routines called by a selected routine, in the application and the routines which a selected routine in the application calls may be determined. Searching call table 304 in the routine ID field 318 for the selected routine, and outputting the identifier in the corresponding routine-called field 320 yields the routines called by the selected routine. Conversely, searching call table 304 in the routine called field 320 and outputting the identifier in the corresponding routine ID field 318 yields the routines calling the selected routine. These correspond to steps 402–410 in FIG. 4 illustrating a methodology of using the database. An apparatus and method for generating and displaying call dependencies using the database is the subject of co-pending, commonly assigned U.S. Patent application entitled, "Tree-Based Interface for Display of Call Dependencies and Method Therefor, incorporated herein by reference.

The present invention provides a mechanism for identifying routine call dependencies within a software program. The called and calling routines are associated via entries in a call table, or call data structure, started within a database which is output in a database file. By accessing the call table within the database, routines which are called by a given routine may be determined, and, conversely, a routine which calls a given routine may also be determined.

Although the present invention and its advantages have been described in detail, it should be understood that various changes, substitutions and alterations can be made herein without departing from the spirit and scope of the invention as defined by the appended claims.

What is claimed is:

1. A method of cross-referencing routines comprising the steps of:
   searching a program file for routine declarations;
   entering a routine identifier in a first table in response to a corresponding routine declaration; and
   searching for routine calls in each routine in response to each said routine identifier.

2. The method of claim 1 wherein said step of searching each routine comprises the step of parsing programming for said routine statement by statement.

3. The method of claim 1 wherein said step of searching each routine further comprises the step of, in response to finding a called routine, entering said routine identifier and an identifier of said called routine in a second table.

4. The method of claim 3 wherein said steps of searching a routine, and entering routine identifiers are repeated for each routine corresponding to a routine identifier in said first table.

5. The method of claim 3 wherein said routine identifier is entered in a first field and said identifier of said called routine is entered in a second field of an entry in said second table.

6. The method of claim 3 further comprising the step of storing said first and second tables in a database.

7. The method of claim 5 further comprising the steps of:
   accessing said second table; and
   determining a routine called by a selected routine, said step of determining said routine comprising the steps of:
      searching said first field for an identifier corresponding to said selected routine; and
      outputting an identifier in said second field of said entry.

8. The method of claim 5 further comprising the steps of:
   accessing said second table; and
   determining a routine calling a selected routine, said step of determining said routine comprising the steps of:
      searching said second field for an identifier corresponding to said selected routine; and
      outputting an identifier in said first field of said entry.

9. A data processing system comprising:
   circuitry operable for searching a program file for routine declarations;
   circuitry operable for entering a routine identifier in a first table in response to a corresponding routine declaration; and
   circuitry operable for searching for routine calls in each routine in response to each routine identifier.

10. The data processing system of claim 1 wherein said circuitry operable for searching each routine comprises circuitry operable for parsing programming for said routine statement by statement.

11. The data processing system of claim 1 wherein said circuitry operable for searching each routine further comprises circuitry operable for, in response to finding a called routine, entering said routine identifier and an identifier of said called routine in a second table.

12. The data processing system of claim 1 wherein said circuitry operable for searching each routine further comprises circuitry operable for, in response to finding a called routine, entering said routine identifier and an identifier of said called routine in a second table.

13. The data processing system of claim 11 wherein said routine identifier is entered in a first field and said identifier of said called routine is entered in a second field of an entry in said second table.

14. The data processing system of claim 11 further comprising circuitry operable for storing said first and second tables in a database.

15. The data processing system of claim 13 further comprising:
   circuitry operable for accessing said second table; and
   circuitry operable for determining a routine called by a selected routine, said circuitry operable for determining said routine comprising:
      circuitry operable for searching said first field for an identifier corresponding to said selected routine; and
      circuitry operable for outputting an identifier in said second field of said entry.

16. The data processing system of claim 13 further comprising:

circuitry operable for accessing said second table; and circuitry operable for determining a routine calling a selected routine, said circuitry operable for determining said routine comprising:

circuitry operable for searching said second field for an identifier corresponding to said selected routine; and circuitry operable for outputting an identifier in said first field of said entry.

17. A computer program product operable for storage on program storage media, the program product operable for cross-referencing software routines, comprising:

programming for searching a program file for routine declarations;

programming for entering a routine identifier in a first table in response to a corresponding routine declaration; and programming for searching for routine calls in each routine in response to each routine identifier.

18. The program product of claim 17 wherein said programming for searching each routine comprises programming for parsing programming for said routine statement by statement.

19. The program product of claim 17 wherein said programming for searching each routine further comprises programming for, in response to finding a called routine, entering said routine identifier and an identifier of said called routine in a second table.

20. The program product of claim 19 wherein said programming for searching a routine, and entering routine identifiers further comprises programming for repeating said searching and entering for each routine corresponding to a routine identifier in said first table.

21. The program product of claim 19 wherein said routine identifier is entered in a first field and said identifier of said called routine is entered in a second field of an entry in said second table.

22. The program product of claim 19 further comprising programming for storing said first and second tables in a database.

23. The program product of claim 21 further comprising:

programming for accessing said second table; and programming for determining a routine called by a selected routine, said circuitry operable for determining said routine comprising:

programming for searching said first field for an identifier corresponding to said selected routine; and programming for outputting an identifier in said second field of said entry.

24. The program product of claim 21 further comprising:

programming for accessing said second table; and programming for determining a routine calling a selected routine, said circuitry operable for determining said routine comprising:

programming for searching said second field for an identifier corresponding to said selected routine; and programming for outputting an identifier in said first field of said entry.

\* \* \* \* \*

UNITED STATES PATENT AND TRADEMARK OFFICE
CERTIFICATE OF CORRECTION

PATENT NO. : 6,564,200 B1 Page 1 of 1
DATED : May 13, 2003
INVENTOR(S) : Alan Curtis Perkins and Paul Brian Young It is certified that error appears in the above-identified patent and that said Letters Patent is hereby corrected as shown below:

Column 6,
Lines 37, 41 and 46, please replace "1" with -- 9 --.
Line 47, please replace "each routine further comprises circuitry operable for, in response to finding a called routine, entering said routine identifier and an identifier of said called routine in a second table" with -- a routine, and entering routine identifiers further comprises circuitry operable for repeating said searching and entering for each routine corresponding to a routine identifier in said first table --.

Signed and Sealed this

Seventh Day of October, 2003

JAMES E. ROGAN
*Director of the United States Patent and Trademark Office*